United States Patent
Baxi et al.

(10) Patent No.: US 7,108,291 B2
(45) Date of Patent: Sep. 19, 2006

(54) CLIP COUPLING

(75) Inventors: Nikhil R. Baxi, Cordova, TN (US);
Gary E. Propst, Olive Branch, MS (US); Isaac U. Shilad, Collierville, TN (US)

(73) Assignee: Parker-Hannifin, Cleveland, OH (US)

( * ) Notice: Subject to any disclaimer, the term of this patent is extended or adjusted under 35 U.S.C. 154(b) by 198 days.

(21) Appl. No.: 10/712,920

(22) Filed: Nov. 13, 2003

(65) Prior Publication Data

US 2004/0222631 A1    Nov. 11, 2004

Related U.S. Application Data

(60) Provisional application No. 60/468,427, filed on May 7, 2003.

(51) Int. Cl.
*F16L 47/00*     (2006.01)
(52) U.S. Cl. .................................. 285/257; 285/239
(58) Field of Classification Search ................ 285/257, 285/239–241, 420, 256, 921
See application file for complete search history.

(56) References Cited

U.S. PATENT DOCUMENTS

| | | | |
|---|---|---|---|
| 2,198,996 A | | 4/1940 | Guarnaschelli |
| 2,614,304 A | | 10/1952 | Oetiker |
| 3,174,777 A | * | 3/1965 | Evans et al. ................. 285/252 |
| 3,303,669 A | | 2/1967 | Oetiker |
| 3,463,517 A | * | 8/1969 | Jeromsom, Jr. et al. ...... 285/93 |
| 3,574,355 A | | 4/1971 | Oetiker |
| 3,589,752 A | * | 6/1971 | Spencer et al. ............. 285/257 |
| 3,724,882 A | * | 4/1973 | Dehar ........................ 285/243 |
| 4,313,629 A | | 2/1982 | Winterhalter |
| 4,607,867 A | | 8/1986 | Jansen |
| 5,387,016 A | | 2/1995 | Joseph et al. |
| 5,772,262 A | * | 6/1998 | Dupont et al. .............. 285/257 |
| 6,010,162 A | | 1/2000 | Grau et al. |
| 6,155,610 A | * | 12/2000 | Godeau et al. ............. 285/242 |
| 6,270,126 B1 | | 8/2001 | Juedes |
| 6,343,772 B1 | * | 2/2002 | Oi ............................... 248/75 |
| 6,846,124 B1 | * | 1/2005 | Warburton-Pitt ............ 403/282 |

FOREIGN PATENT DOCUMENTS

| | | |
|---|---|---|
| EP | 0499819 A1 | 1/1992 |
| EP | 0760920 B1 | 5/1995 |

* cited by examiner

*Primary Examiner*—Vishal Patel
(74) *Attorney, Agent, or Firm*—Daniel J Whitman; Joseph J. Pophal

(57) ABSTRACT

A connector, for attachment with a hose, having a generally tubular shaped longitudinal nipple with a proximal and distal end and a bore extending therethrough. The nipple has an exterior surface that defines an outwardly extending annular protuberance located between both ends. The connector also includes a clip, for attachment with the nipple, having a base portion connected with at least two longitudinally extending legs. The base portion has an axial opening, a radial opening, a support bar with a first and second end, a first and second arm portion attached to the support bar first and second end respectively, both arm portions including a set of locating fingers and one of the at least two longitudinally extending legs. Each locating finger has an inner surface is adapted to mate with the annular protuberance. The at least two longitudinally extending legs are radially outwardly distanced from the nipple and have an outer surface adapted to receive a compressible clamp.

15 Claims, 4 Drawing Sheets

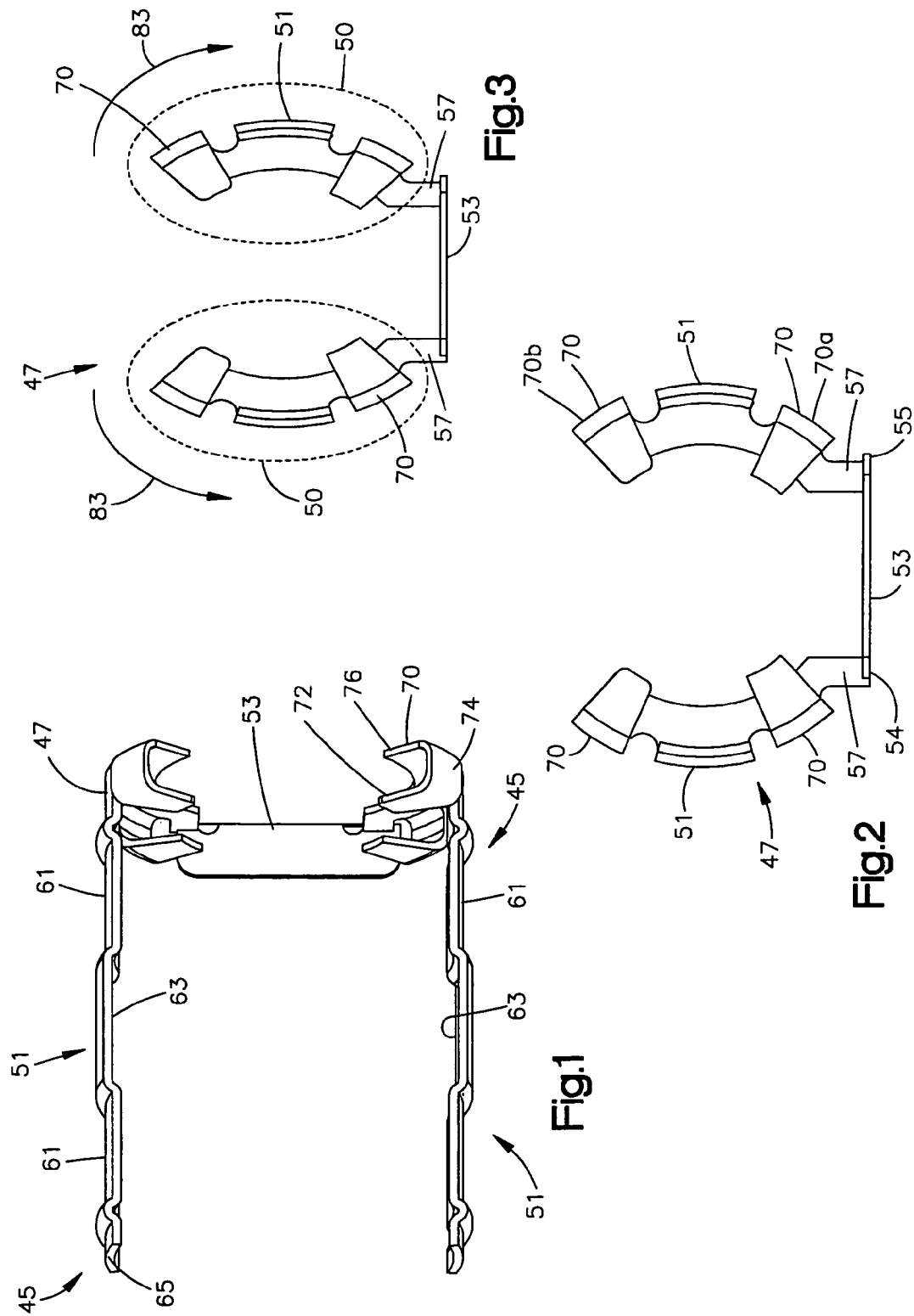

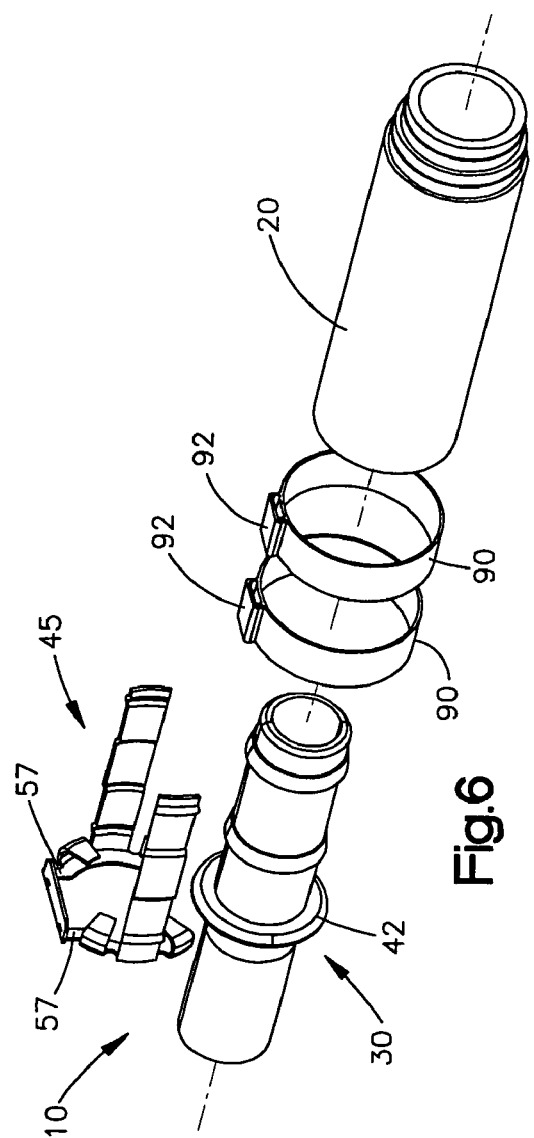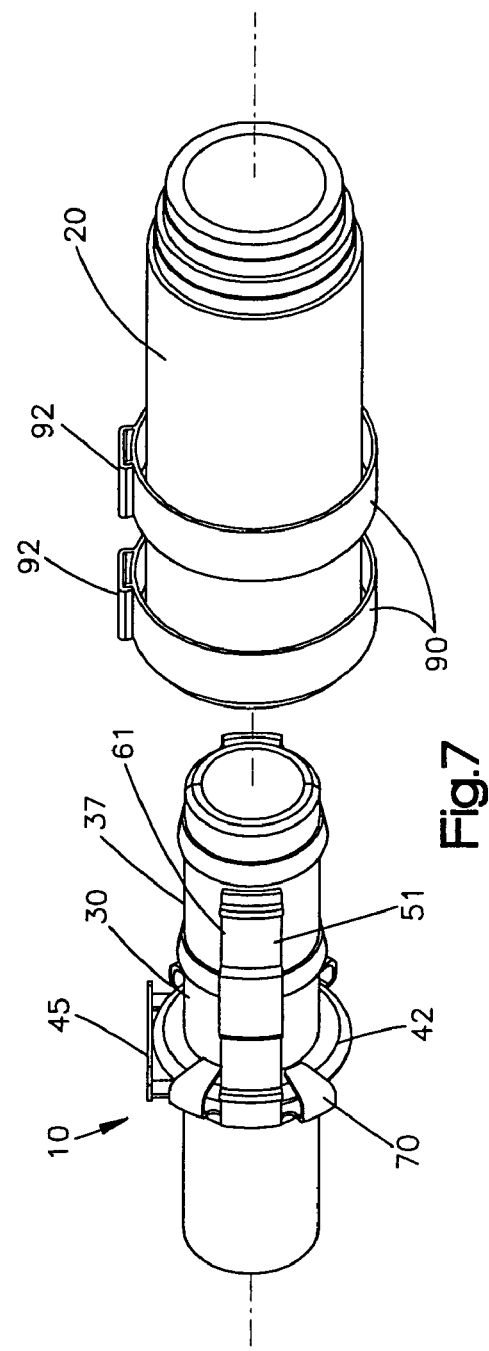

CLIP COUPLING

CROSS-REFERENCE TO RELATED CASES

The present application claims the benefit of the filing date of U.S. Provisional Application Ser. No. 60/468,427; filed May 7, 2003, the disclosure of which is expressly incorporated herein by reference.

BACKGROUND OF THE INVENTION

Couplings that are used as connectors in order to attach one fluid conductor to a second fluid conductor are well known in the art. A specific form of such a coupling is one that connects tubing to hose. This type of coupling is comprised of a coupling nipple that is inserted into the inner bore of a conduit and a coupling shell or bracket that fits over the outer surface of the conduit. The shell/bracket is inwardly deformed in order to compress the conduit between the nipple and shell, thus retaining the conduit relative to the coupling.

The coupling shell/bracket can take many forms depending on the type of conduit attached, the pressure of the fluid being conducted, the size of the conduit, and the use of the coupling/conduit assembly. A common form of shell is a cylindrical socket having an inner diameter greater than the outer diameter of the conduit. Shells can be permanently inwardly deformed so that a portion of the shell, namely its internal teeth, digs into the conduit. An example of such a shell is shown in U.S. Pat. No. 5,387,016 to Joseph et al. Shells can also be threadedly attached to the conduit so that an internal thread of the shell digs into the conduit. Both of these forms of shells are used for higher-pressure applications that require a portion of the shell to physically dig into the conduit in order to retain the connection.

Many connections only required a compression of the conduit between the outer shell/bracket and the nipple in order to hold the conduit in place relative to the coupling. The bracket can be a simple circumferential band that is tightened over the conduit, thus compressing the conduit between the band and the nipple. An example of this form of bracket, or clamp, is shown in U.S. Pat. No. 2,614,304 to Oetiker and European Patent EP 0760920B1 to Manuli. This type of bracket must be positioned accurately and does not distribute the compressive forces over the length of the nipple.

Another bracket form, which provides a simple type of attachment, is shown in U.S. Pat. No. 4,607,867 to Jansen and U.S. Pat. No. 6,010,162 to Grau et al. This bracket is comprised of elongated strips that run parallel with the longitudinal axis of the conduit and a series of clamps that are placed over the elongated strips. The clamps are tightened so that the conduit is compressed between the nipple and the strips. The elongated strips in these prior art references are flat which causes the abutting contact between the strips and the outer surface of the conduit to be at a point rather than a surface contact.

It is desirable to have the bracket affixed to coupling nipple in order to avoid attaching multiple components of the connector to the conduit. It is also desirable to have the bracket centered relative to the nipple. The above referenced U.S. Pat. No. 6,010,162 to Grau et al. and European Publication EP 0499819 A1 to Oetiker show the bracket affixed to a shoulder on the nipple. The bracket has a vertical portion that contacts a surface on one side of the shoulder. Since the bracket contacts the shoulder on only one side, the bracket can move, longitudinally, in the same direction as the conduit when the conduit is being inserted between the nipple and the bracket. The Grau patent provides a shoulder clip having two vertical sides that contact both vertical surfaces of the shoulder. The bracket can still move relative to the nipple during the installation of the conduit since only one shoulder clip is used. Another shoulder clip is needed to center the bracket on the nipple and counteract any forces from the conduit that may cause the bracket to move. The above referenced U.S. Pat. No. 4,607,867 to Jansen affixes its elongated strips to the nipple with the use of clamps. Specifically a circumferential groove is machined into the outer surface of the nipple and receives a portion of the bracket, but only after a clamp is used to inwardly compress the bracket end.

Another method of attachment of a shell/bracket to a nipple is shown in U.S. Pat. No. 5,387,016 to Joseph et al. A vertical portion of the shell is placed adjacent to a raised portion of the nipple prior to the formation of an annular bead in the nipple that compresses the vertical portion between the bead and raised portion. This attachment process requires multiple steps and permanently affixes the shell to the nipple, thus eliminating any repeated use of the coupling with another conduit. It is advantageous to have a shell/clamp that can be reused, or is field attachable. The above referenced U.S. Pat. No. 6,010,162 to Grau et al. supplies a bracket that can be easily attached at the location of use. The shortcoming of this style of bracket is that it can be permanently deformed when clamps inwardly compress the bracket.

SUMMARY OF THE INVENTION

The present invention provides a connector for attachment with a hose wherein the connector has a generally tubular shaped longitudinal nipple with a proximal end, a distal end and a bore extending therethrough. The nipple has an exterior surface that defines an outwardly extending annular protuberance located between the proximal and distal ends. The connector also includes a clip for attachment with the nipple and has a base portion connected with at least two longitudinally extending legs. The base portion has an axial opening, a radial opening, a support bar with a first end and a second end, a first arm portion attached to the support bar first end with a first set of locating fingers and one of the at least two longitudinally extending legs, and a second arm portion attached to the support bar second end with a second set of locating fingers and another of the at least two longitudinally extending legs. Each of the locating fingers has an inner surface that is adapted to mate with the annular protuberance. The at least two longitudinally extending legs are radially outwardly distanced from the nipple exterior surface and has an outer surface adapted to receive at least one annular, diametrically compressible clamp.

A further feature of the noted connector includes having the annular protuberance in the form of an annular bead that circumferentially extends about the exterior surface. The annular bead has two generally radially extending parallel surfaces with a curved portion therebetween. Another feature has the at least two locating fingers with an inner surface shaped similarly to the annular bead, wherein the inner surface of the fingers is in abutting contact with the annular bead when the clip is attached to the nipple.

Still another feature of the noted coupling includes the first and second set of locating fingers having at least two fingers that are equally circumferentially spaced from adjacent fingers. Another feature includes having the at least two locating fingers having opposing axial surfaces which are adapted to affixedly contact the external axial surface of the outwardly extending annular protuberance.

Still yet another feature of the noted coupling has the first set of locating fingers with a first and a second finger with one of the at least two longitudinally extending legs positioned between the first and the second locating finger. The second set of locating fingers has a third and a fourth finger with a second of the at least two longitudinally extending legs positioned between the third and the fourth finger. The first, second, third and fourth fingers are substantially equally circumferentially distributed. Another feature has the radial opening located between the second and the third finger.

Another feature of the noted coupling has the at least two longitudinally extending legs with an arc-shaped radial extent. A further feature has the at least two longitudinally extending legs with at least one radially raised surface. The clamp receiving outer surface of the at least two longitudinally extending legs is comprised of two longitudinally extending surfaces and the at least one radially raised surface is interposed between the two surfaces.

Still another feature of the noted coupling has the support bar first and second ends with a reduced cross-section so as to function in a hinge-like manner so that the first and the second arm portions can move radially inwardly and outwardly and axially bi-directionally with respect to the support bar. Another feature has the at least two longitudinally extending legs with a distal end extending for a distance substantially the same as that of the nipple distal end portion.

BRIEF DESCRIPTION OF THE DRAWINGS

FIG. 1 is a perspective view of a clip, in accordance with this invention.

FIG. 2 is a frontal view of the clip shown in FIG. 1.

FIG. 3 is a view similar to FIG. 2 with directional arrows indicating expansion of clip.

FIG. 6 is an exploded, perspective view of the various components of a hose assembly, according to the present invention.

FIG. 7 is an exploded view similar to FIG. 6 with a formed coupling prior to attachment with a conduit.

DETAILED DESCRIPTION OF THE INVENTION

Figure 9:
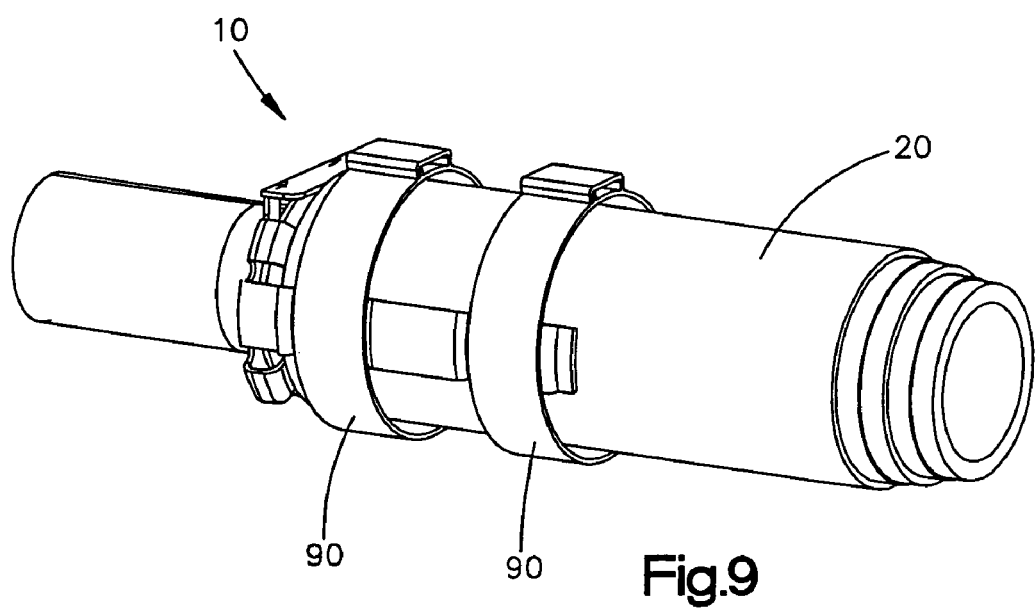
FIG. 9 is a side, perspective view of the formed hose assembly, according to the present invention.

Referring first to FIGS. 6, 7 and 9, a coupling 10 according to the present invention is shown prior to assembly (FIGS. 6, 7) and as attached to a hose, or conduit 20, thus forming a hose assembly (FIG. 9). Coupling 10 can be used as a connector for any desired fluid handling purpose. As an example, coupling 10 can be used to connect tubing (not shown) to hose 20 that carries refrigerant to an automobile air conditioning system. Coupling 10 is comprised of a hose nipple 30 and a clip 45.

Figure 4:
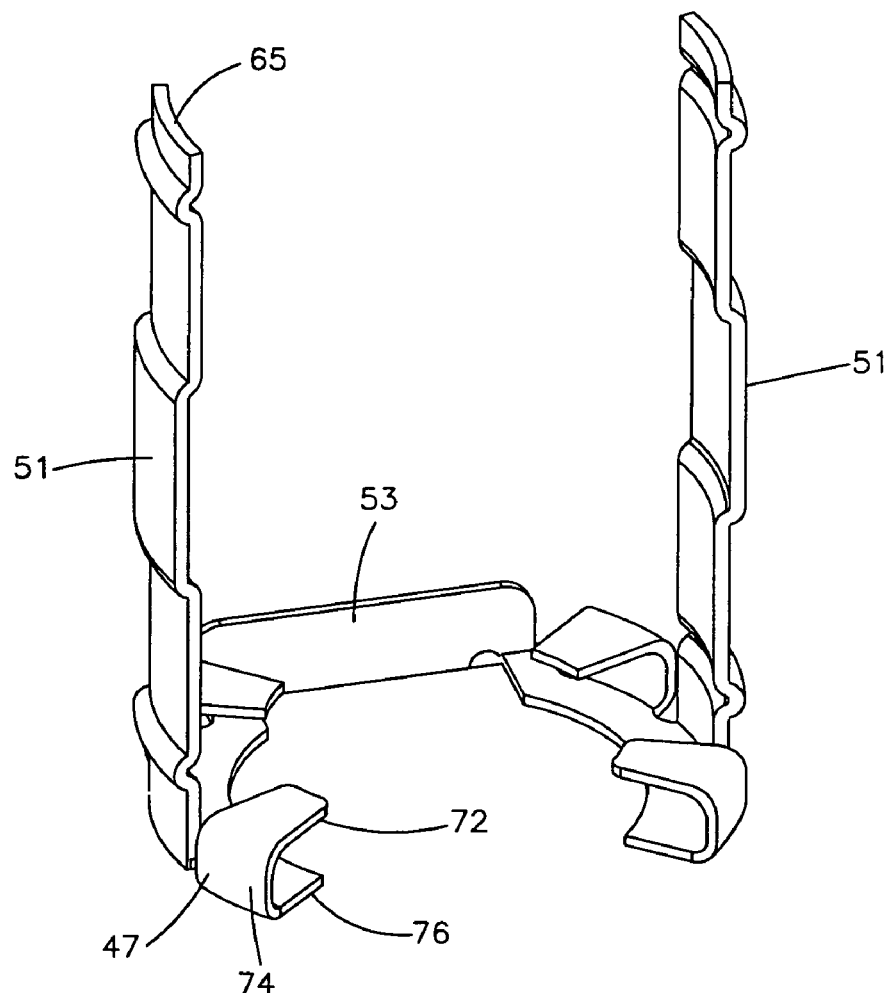
FIG. 4 is a further perspective view of the clip.
Figure 5:
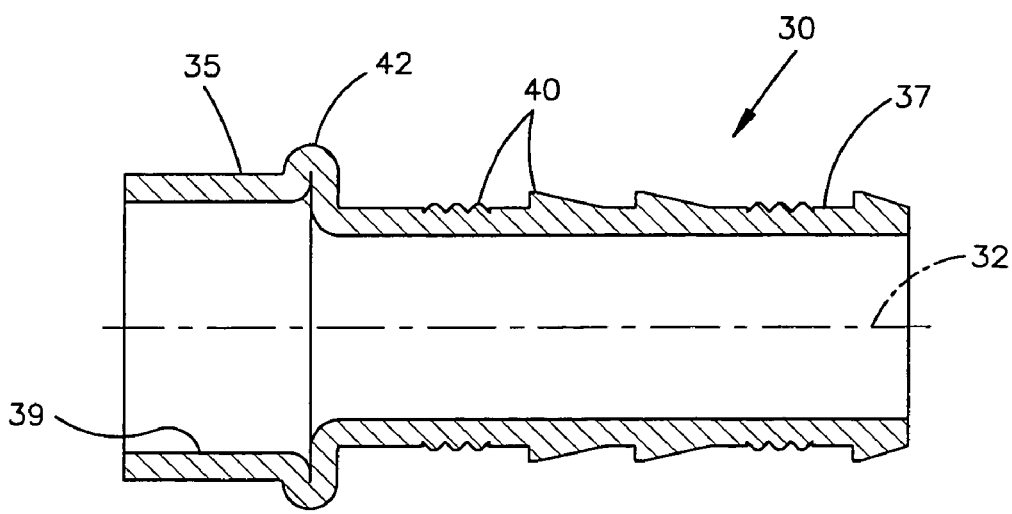
FIG. 5 is a longitudinal, cross-sectional view of a nipple that is a component of the present invention.

Referring now to FIGS. 5 and 6, hose nipple 30 has a longitudinal axis 32 about which a generally tubular shape is formed. Nipple 30 has a first, proximal end portion 35 and a second, distal end portion 37. A continuous bore 39 extends from proximal end portion 35 through distal end portion 37. Nipple 30 has a series of one-way barbs 40 on its peripheral surface that come in contact with the inner surface of hose 20 when hose 20 and coupling 10 are assembled together. An outwardly, fully circumferentially extending, annular protuberance, or bead 42, is axially positioned between proximal end portion 35 and distal end portion 37.

Finally, referring to FIGS. 1, 2, 3 and 4, clip 45 is comprised of a base or body portion 47 and at least two, circumferentially spaced, longitudinally extending legs 51 attached to base portion 47. Base portion 47 includes a support bar 53 having a first end 54 and a second end 55. A hinge or pivot portion 57 of decreased strength or material cross-section is present at both ends 54, 55 of support bar 53. Each one of hinges 57 also serves as a connection with a transverse arm portion 50 that includes a multiple of short pincer or locating fingers 70 as well as the previously noted longitudinal leg 51

Longitudinal legs 51 are designed to provide spaced locating surfaces 61, for receiving clamps 90 (discussed below) separated by a raised relief surface 63 for receiving an accumulated portion of a resilient compound (from an elastomeric/rubber hose 20, for example). Longitudinal legs 51 are laterally curved (best shown at 65) in an arc-like manner such that they not only complement the radius of curvature of the peripheral surface of hose 20 but also provides for the maximum retention to hose 20 by maximizing the contact area between the two when fastened (as will be discussed below). Upon installation, one or more clamps 90 will create a maximum and even radial pressure on hose 20 due to the noted curvature 65 of legs 51.

There are two sets of transverse arm portions 50, one perpendicularly extending from each end of support bar 53. In the example shown in FIGS. 1, 2 and 3, each transverse arm portion 50 includes a first pincer or locating finger 70a immediately adjacent to, and connected with, hinge 57. A second pincer finger 70b is located at the distal end of each transverse arm portion 50, with longitudinal leg 51 being located between and extending transversely from between pincer fingers 70a and 70b. The four pincer fingers 70 shown in FIG. 2 are radially positioned in such a fashion that, upon the attachment of clip 45 to nipple 30 (as discussed below), such that pincer fingers 70 are generally equally spaced circumferentially.

Each pincer finger 70 includes a first flat portion 72 and a second flat portion 76 connected via an intermediate curved portion 74. First and second flat portions 72, 76 are: generally parallel to each other, generally radially inwardly-directed, generally perpendicular to nipple longitudinal axis 32, and axially separated by curved portion 74. The shape, curvature, and radial orientation of the inside surface of pincer finger 70 allows for an easy fit onto the exterior surface of nipple bead 42. The length or radial extent of first flat portion 72 differs from that of second flat portion 76 in order to complement the differing radial extent and provide better nesting of opposing sides of bead 42, as best seen in FIG. 5.

FIGS. 6–9 show a step-by-step approach of fabricating a hose assembly with coupling 10. As shown in FIG. 7, clip 45 is attached to nipple 30 by placing pincer fingers 70 over bead 42 so that the interior surfaces of pincer fingers 70 comes into abutting contact with the exterior surface of bead 42. In particular, the interior surfaces of first and second flat portions 72, 76 contact the opposed outer, flat axial surfaces of bead 42, and the interior surface of curved connecting portion 74 contacts the outer, curved surface of bead 42. When pincer fingers 70 are connected with bead 42, longitudinal legs 51 are axially aligned with nipple longitudinal axis 32 with an annular gap (not shown per se) existing between the exterior surface of nipple distal end portion 37 and the radially inner surfaces of longitudinal legs 51. Also shown in FIG. 7 are several axially-spaced ring-like clamps 90 positioned over conduit 20. Clamps 90 preferably have U-shaped locking folds 92 that can be compressed, via permanent deformation, in order to decrease the diameter of clamps 90. U-shaped locking fold 92 has two parallel sides connected by a perpendicular side. As is well known in the art, the two parallel sides can be compressed together in order to decrease the diametrical size of clamp 90.

Figure 8:
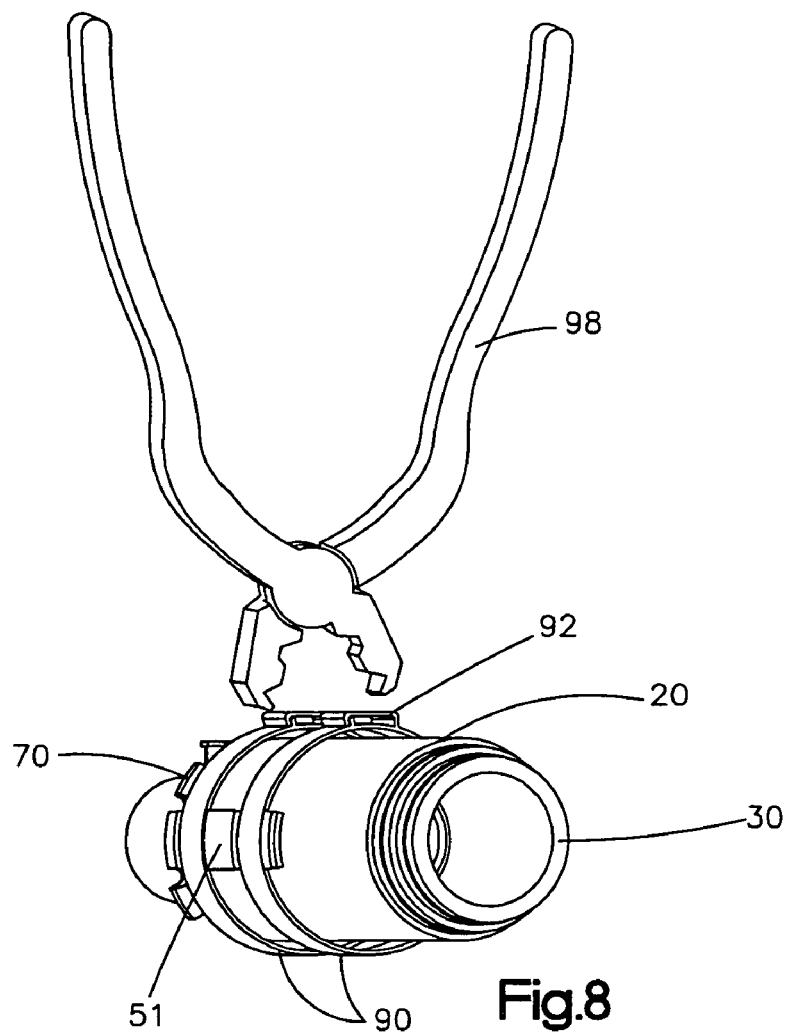
FIG. 8 is a frontal, perspective view of the hose assembly with a tool used to fasten the coupling to the conduit.

As is best seen in FIGS. 7–9, conduit 20, with clamps 90 located on its outer surface, mates with coupling 10 such that nipple 30 fits within the interior bore of conduit 20 and longitudinal legs 51 fit over the exterior surface of conduit 20 and underneath clamps 90. It should be noted that clamps 90 rest within locating surfaces 61 on longitudinal legs 51. A tool 98, such as a pair of pliers, is used to tighten clamp U-shaped locking fold 92 by compressing the sides of the "U" together. Upon the tightening of clamp 90 over longitudinal legs 51, the latter are brought into close, abutting contact with the outside surface of conduit 20, thus compressing conduit 20 between nipple 30 and longitudinal legs 51. This ensures that conduit 20 will remain in its desired position, relative to coupling 10, during its use.

The arc-like radial curvature 65 of longitudinal legs 51 ensures that the entire inside surface of legs 51 contacts, and uniformly mates with the exterior surface of conduit 20, rather than just a portion of longitudinal leg 51 if it were not curved (which would create an undesired high stress pinch point), as would occur with a flat longitudinal leg. Since conduit 20 is compressed between nipple 30 and legs 51, material from elastic conduit 20 will tend to "flow" away from the compressed area underneath clamps 90. The design of legs 51 allows for this material to accumulate under raised relief surfaces 63 (as shown in FIG. 1).

Referring to FIGS. 3 and 6, hinges or pivots 57 of base or body portion 47 allows transverse arm portions 50 to radially expand, in the radially outward direction indicated by arrows 83 when pincer or locating fingers 70 are placed over bead 42 for ease of assembly. Hinges 57 also permit transverse arm portions 50 to spring back into close gripping contact with bead 42 after placement of clip 45 on nipple 30. This expansion/rebounding characteristic of hinges 57 eliminates any permanent deformation to support bar 53. Without hinges 57, support bar 53 would act as the hinge, or pivot point, for the expansion of transverse arm portions 50 and the rigidity of clip 45 would be compromised. Hinges 57 also prevent permanent deformation of clip 45 when transverse arm portion 50 is subjected to axial forces. If any longitudinal leg 51 or locating finger 70 is subjected to an axial force, hinge 57 prevents this force from permanently deforming support bar 53.

Hinge 57 also contributes to the ease of assembly of coupling 10. The assembler of coupling 10 need only push clip 45, and specifically base portion 47, radially inwardly towards bead 42 until all pincer fingers 70 fully contact bead 42. The same ease holds true for the disassembly of coupling 10. To remove clip 45 from nipple 30, the user only needs to pull support bar 53 away from bead 42. Once again, hinge 57 allows for transverse arm portions 50 to open up over bead 42.

Since pincer or locating fingers 70 are equally distributed around the circumference of nipple 30, the assembler need not be concerned with the alignment of clip 45, and specifically longitudinal legs 51, with respect to nipple 30. Longitudinal legs 51 should be parallel with longitudinal axis 32 for proper contact with conduit 20. When all pincer fingers 70 are in place around, and attached to, bead 42, longitudinal legs 51 will automatically be aligned with axis 32. Longitudinal legs 51 are circumferentially positioned between two pincer fingers 70a, 70b on each of arm portions 50. This adjacent support on bead 42 also ensures that each longitudinal leg 51 continues to remain parallel to longitudinal axis 32 during the use of the hose assembly. Adjacent pincer fingers 70a and 70b provide stability to clip 45 as longitudinal legs 51 are bent, pulled and subjected to outside forces. It should be noted that in the illustrated embodiment, clip 45 has four pincer fingers 70 and two longitudinal legs 51, although the present invention needs only utilize at least two pincer fingers 70 and two longitudinal legs 51.

Referring to FIGS. 1 and 7, first and second flat portion 72, 76 of pincer fingers 70 provide bi-directional, axial support/retention for clip 45 during assembly and use. During initial assembly, when conduit 20 is placed over nipple 30, its outer surface, or cover, can contact either or both of longitudinal legs 51. Without first flat portion 72, clip 45 would travel in the same direction as conduit 20 while it is axially mated with nipple 30. Since pincer fingers 70 are circumferentially equally distributed, as mentioned above, contact of conduit 20 with only one longitudinal leg 51 during assembly will not misalign clip 45 due to the support of first and second flat portions 72, 76. Without first and second flat portions 72, 76 on each pincer finger 70, contact with only one longitudinal leg 51 will cause the pincer finger 70 on the diametrically opposite side to pivot on bead 42. During use, it is common for conduit 20 to be pulled with respect to nipple 30. Since clip 45 is tightly clamped onto conduit 20, clip 45 will experience the same pull, or tension. Second flat portion 76 of pincer finger 70 prevents any axial movement of clip 45, and conduit 20, towards nipple distal end 37 since it is held in position by bead 42.

Support bar 53 ensures that clip 45 maintains its designed shape when other components of clip 45 are deformed. This provides a reusability feature for coupling 10. Even though longitudinal legs 51 may be inwardly compressed (due to over squeezing of clamps 90) and pincer fingers 70 may be radially outwardly elastically deformed (as shown by arrows 83) in order to be placed over bead 42, clip 45 rebounds to its initial shape due to the strength and resilience of support bar 53. Support bar 53 provides individual support to each longitudinal leg 51 during axial movement of one longitudinal leg 51 without affecting the other longitudinal leg 51, due to the strength of support bar 53 and the flexibility of each hinge or pivot 57.

What is claimed is:

1. An improved connector for attachment with a hose having a generally tubular shaped longitudinal nipple with a proximal end, a distal end and a bore extending therethrough, said hose nipple having an exterior surface defining an outwardly extending annular protuberance located between said proximal and distal ends, wherein the improvement comprises:

a clip for attachment with said hose nipple, said clip having a base portion connected with at least two longitudinally extending legs, said base portion having an axial opening, a radial opening, a support bar with a first end and a second end, a first arm portion attached to said support bar first end having a first set of locating fingers and one of said at least two longitudinally extending legs and a second arm portion attached to said support bar second end having a second set of locating fingers and another of said at least two longitudinally extending legs, said radial opening being located between said first and second arm portions and opposite said support bar, each of said locating fingers having an inner surface which is adapted to mate with said annular protuberance, said at least two longitudinally extending legs being radially outwardly distanced from said nipple exterior surface and have an outer surface adapted to receive at least one annular, diametrically compressible clamp.

2. The connector as in claim 1 wherein said outwardly extending annular protuberance is an annular bead circumferentially extending about said exterior surface, said annular bead having two generally radially extending parallel surfaces with an curved portion therebetween.

3. The connector as in claim 2 wherein said at least two locating fingers have an inner surface shaped similarly to that of said annular bead, wherein said inner surface is in abutting contact with said annular bead when said clip is attached to said nipple.

4. The connector as in claim 1 wherein said first and said second set of locating fingers have at least two fingers which are equally circumferentially spaced from adjacent ones of said fingers.

5. The connector as in claim 1 wherein said first set of locating fingers has a first and a second finger with one of said at least two longitudinally extending legs positioned between said first and said second locating finger, said second set of locating fingers having a third and a fourth finger with a second of said at least two longitudinally extending legs positioned therebetween, said first, second, third and fourth finger being substantially equally circumferentially distributed.

6. The connector as in claim 5 wherein said radial opening is located between said second and third finger.

7. The connector as in claim 1 wherein said at least two locating fingers have opposing axial surfaces which are adapted to affixedly contact the external axial surface of said outwardly extending annular protuberance.

8. The connector as in claim 1 wherein said at least two longitudinally extending legs have an arc-shaped radial extent.

9. The connector as in claim 1 wherein said at least two longitudinally extending legs have at least one radially raised surface.

10. The connector as in claim 8 wherein said clamp receiving outer surface of said at least two longitudinally extending legs is comprised of two longitudinally extending surfaces and said at least one radially raised surface is interposed between said two surfaces.

11. The connector as in claim 1 wherein said support bar first and second ends are of reduced cross-section so as to function in a hinge-like manner so that said first and said second arm portions can move radially inwardly and outwardly and axially bi-directionally with respect to said support bar.

12. The connector as in claim 1 wherein said at least two longitudinally extending legs have a distal end extending for a distance substantially the same as that of said nipple distal end portion.

13. A hose assembly for conducting fluid comprised of a conduit, a connector and at least one annular clamp, wherein:

said conduit has an inner surface, an outer surface and an end;
said connector has:
a generally tubular shaped longitudinal nipple with a proximal end, a distal end and a bore extending therethrough, said nipple having an exterior surface defining an outwardly extending annular protuberance, located between said proximal and distal ends, having two generally radially extending parallel surfaces joined via a curved portion, said nipple distal end being adapted for insertion into said conduit end and having an outside diameter similar to said conduit inner surface diameter wherein the improvement comprises:
  a clip for attachment with said hose nipple having:
  a base portion connected with at least a first and a second longitudinally extending leg, said base portion having:
  an axial opening;
  a radial opening;
  a support bar with a first end and a second end;
  a first hinge portion of said support bar first end and separating said support bar first end from a first arm portion;
  said first arm portion having:
  a first locating finger;
  a second locating finger; and
  said first longitudinally extending leg located between said first and second locating finger;
  a second hinge portion of said support bar second end and separating said support bar second end from a second arm portion;
  said second arm portion having:
  a third locating finger;
  a fourth locating finger; and
  said second longitudinally extending leg located between said third and fourth locating fingers;
  each of said locating fingers having an inner surface shaped similarly to said annular protuberance which allows each of said locating fingers to mate with said annular protuberance; and
  said first, second, third and fourth locating fingers being substantially equally circumferentially distributed;
  said first and second longitudinally extending legs being radially outwardly distanced from said nipple exterior surface and have an outer surface with at least one radially recessed portion which receives said annular clamp and at least one radially raised surface adjacent said at least one clamp receiving portion; and
  said annular clamp being positioned around said first and said second longitudinally extending legs, said conduit and said nipple, and having a diametrically compressible portion which allows said clamp to compress said conduit between said nipple and both of said longitudinally extending legs.

14. The hose assembly as in claim 13 wherein said at least first and second longitudinally extending legs are laterally curved in an arc-like manner.

15. The hose assembly as in claim 14 wherein the radius of curvature of said legs complement the radius of curvature of the peripheral outer surface of said conduit.

* * * * *